(12) United States Patent
Durand et al.

(10) Patent No.: US 9,119,016 B2
(45) Date of Patent: **\*Aug. 25, 2015**

(54) MULTIPLEXING MULTIPLE MOBILE SERVICES ON A SINGLE MOBILE ACCESS POINT NAME

(71) Applicant: Affirmed Networks, Inc., Acton, MA (US)

(72) Inventors: Terry Durand, Roswell, GA (US); Timothy Mortsolf, Amherst, MA (US); Deepak Garg, Nashua, NH (US)

(73) Assignee: Affirmed Networks, Inc., Acton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,043

(22) Filed: Dec. 6, 2013

(65) Prior Publication Data

US 2014/0092848 A1   Apr. 3, 2014

Related U.S. Application Data

(63) Continuation of application No. 13/214,556, filed on Aug. 22, 2011, now Pat. No. 8,605,672.

(51) Int. Cl.
| | |
|---|---|
| H04W 4/00 | (2009.01) |
| H04M 15/00 | (2006.01) |
| H04W 4/24 | (2009.01) |
| H04L 12/851 | (2013.01) |
| H04L 12/725 | (2013.01) |
| H04L 12/801 | (2013.01) |
| H04L 29/08 | (2006.01) |

(52) U.S. Cl.
CPC ............. *H04W 4/001* (2013.01); *H04L 45/308* (2013.01); *H04L 47/2441* (2013.01); *H04M 15/00* (2013.01); *H04M 15/41* (2013.01); *H04M 15/61* (2013.01); *H04M 15/62* (2013.01); *H04M 15/765* (2013.01); *H04W 4/24* (2013.01); *H04L 47/14* (2013.01); *H04L 67/327* (2013.01)

(58) Field of Classification Search
USPC .................. 370/328, 329, 400, 401, 431, 432
See application file for complete search history.

(56) References Cited

U.S. PATENT DOCUMENTS

| | | |
|---|---|---|
| 2004/0131023 A1 | 7/2004 | Auterinen |
| 2005/0136832 A1 | 6/2005 | Spreizer |

(Continued)

OTHER PUBLICATIONS

International Search Report and Written Opinion issued by the U.S. Patent and Trademark Office as International Searching Authority for International Application No. PCT/US12/21520 mailed May 8, 2012 (8 pgs.).

(Continued)

*Primary Examiner* — Kerri Rose
(74) *Attorney, Agent, or Firm* — Wilmer Cutler; Pickering Hale and Dorr LLP

(57) ABSTRACT

Methods and apparatus, including computer program products, for multiplexing multiple mobile services on a single mobile access point name (APN). A method includes, in a General Packet Radio Service (GPRS) network, examining Internet Protocol (IP) packets that traverse a mobile GN link of a Gateway GPRS Support Node (GGSN), and applying a combination of packet protocols coupled with a carrier defined set of work flow rules to route the IP packets to their next destination and earmark billing CDRs for mediation and correlation by back office IT systems residing with a carrier in the mobile network.

19 Claims, 2 Drawing Sheets

(56) References Cited

U.S. PATENT DOCUMENTS

| | | |
|---|---|---|
| 2006/0008063 A1 | 1/2006 | Harnesk et al. |
| 2006/0168655 A1 | 7/2006 | Grandmaitre et al. |
| 2008/0240082 A1 | 10/2008 | Feldman et al. |
| 2009/0109845 A1 | 4/2009 | Andreasen et al. |
| 2010/0128708 A1 | 5/2010 | Liu et al. |
| 2012/0190331 A1 | 7/2012 | Ahmed et al. |

OTHER PUBLICATIONS

Extended European Search Report issued by the European Patent Office for European Patent Application No. 12825827.4 dated Mar. 6, 2015 (7 pgs.).

100

Receive a flow of Internet Protocol (IP) packets having a generic access point name (APN) at a traffic steering server
102

↓

Identify a specific service multiplexed on the generic APN
104

↓

Route the flow of IP packets to an application service element based on the identification
106

↓

Earmark billing CDRs for mediation and correlation by back office IT systems residing with the carrier in the network
108

FIG. 2

MULTIPLEXING MULTIPLE MOBILE SERVICES ON A SINGLE MOBILE ACCESS POINT NAME

CROSS-REFERENCE SECTION

This application is a continuation of and claims priority to U.S. patent application Ser. No. 13/214,556, filed Aug. 22, 2011, the disclosure of which is incorporated herein by reference in its entirety.

BACKGROUND OF THE INVENTION

The invention generally relates to cellular networks, and more specifically to multiplexing multiple mobile services on a single mobile access point name (APN).

In general, an access point name (APN) identifies an internet protocol (IP) packet data network (PDN), which a mobile data user wants to communicate with. In addition to identifying a PDN, an APN may also be used to define the type of service, e.g., connection to a wireless application protocol (WAP) server or a connection to a multimedia messaging service (MMS), which is provided by the PDN. In today's mobile networks the APN convention is used to provide mobile carriers with an ability to differentiate mobile services from each other and to properly route and bill for their use. In order to facilitate the mobile device making requests to the network, the APNs must be provisioned in the mobile device and in the various network elements. This must be done for each APN the carrier plans to offer service over its network.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for multiplexing multiple mobile services on a single mobile APN.

In general, in one aspect, the invention features a method including, in a mobile network, receiving a flow of Internet Protocol (IP) packets having a generic access point name (APN) at a traffic steering server, the generic APN assigned by a carrier in the mobile network and representing a plurality of services, identifying a specific service multiplexed on the generic APN, and routing the flow of IP packets to an application service element based on the identification.

In another aspect, the invention features a method including, in a General Packet Radio Service (GPRS) network, examining Internet Protocol (IP) packets that traverse a mobile GN link of a Gateway GPRS Support Node (GGSN), and applying a combination of packet protocols coupled with a carrier defined set of work flow rules to route the IP packets to their next destination and earmark billing CDRs for mediation and correlation by back office IT systems residing with a carrier in the mobile network.

In another aspect, the invention features a method including, in a General Packet Radio Service (GPRS) network, assigning a generic access point name (APN) to a plurality of services, and routing a flow of Internet Protocol (IP) packets having the APN to a traffic steering server for routing the flow of IP packets to an application service element based on an identification of the IP packets.

Other features and advantages of the invention are apparent from the following description, and from the claims.

BRIEF DESCRIPTION OF THE DRAWINGS

The invention will be more fully understood by reference to the detailed description, in conjunction with the following figures, wherein:

FIG. 2 is a flow diagram.

DETAILED DESCRIPTION

Figure 1:
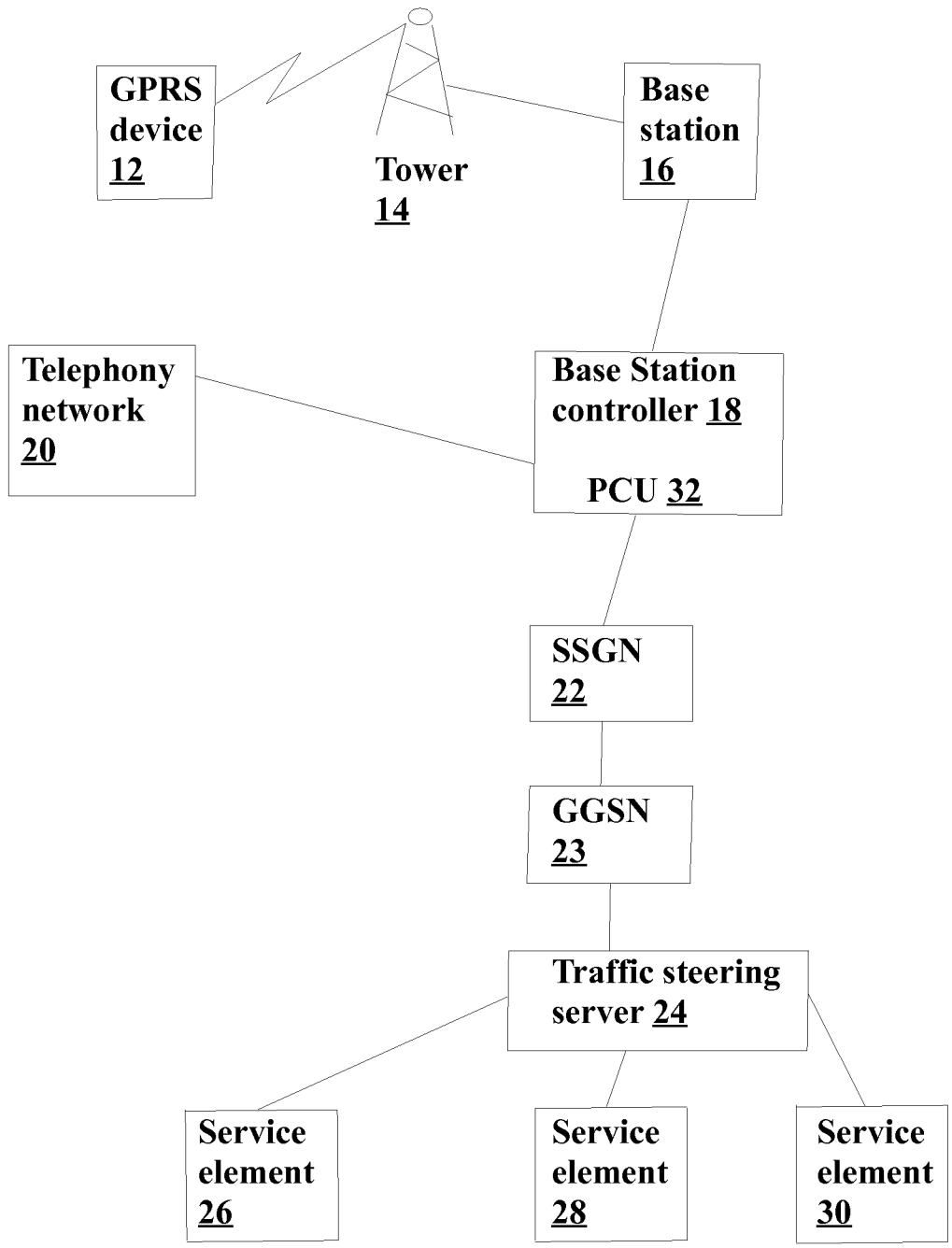
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, printer, etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The development and institution of the APN concept among wireless carriers unified the manner in which subscribers are provided services in their home network and seamlessly roam to foreign networks while maintaining access to their home based services. It also streamlined the billing and revenue reconciliation process among wireless carriers by implementing a service routing model where all service requests are routed over the GPRS Roaming Exchange (GRX) back to the home PDN. This facilitated a charging model where billing records are created in both the serving PDN (Serving GPRS Support Node (SGSN)-based CDRs, i.e., accounting records) and the home PDN (Gateway GPRS Support Node (GGSN) providing the service). While the APN fulfilled a much required traffic steering and billing capability among wireless carriers, the growth and emergence of new wireless carrier based services and smart phones brought about another challenge. Scalability of the APN both in the network and the device became an issue with the introduction of smart phones such as the Apple iPhone®. With the introduction of smart phones the carriers allowed open network architectures where the content providers began to control many of the services on the device. These open networks architectures created a situation where additional APN's needed to be provisioned into the device in order to resolve to the proper PDN providing the new service. Generally, the maximum number of APN's that can be programmed into a device is four (4) entries, therefore the APNs had to be managed carefully. The wireless carriers used the four entries to define the proper PDN and the proper application server inside the carrier networks that provides the service for that particular APN.

Principles of the present invention apply to 3G and 4G mobile networks. 3G (3rd generation mobile telecommunications) is a generation of standards for mobile phones and mobile telecommunication services fulfilling the International Mobile Telecommunications-2000 (IMT-2000) specifications by the International Telecommunication Union. 4G is the fourth generation of cellular wireless standards. It is a successor to the 3G and 2G families of standards. In 2009, the ITU-R organization specified the IMT-Advanced (International Mobile Telecommunications Advanced) requirements for 4G standards, setting peak speed requirements for 4G service at 100 Mbit/s for high mobility communication (such as from trains and cars) and 1 Gbit/s for low mobility communication (such as pedestrians and stationary users).

As shown in FIG. 1, a network 10 includes a General Packet Radio Service (GPRS) mobile device 12 that communicates wirelessly with tower 14 to a base station (BS) 16. The BS 16 is linked to a base station controller (BSC) 18. The BSC 18 is linked to a telephony network 20 and a Serving GPRS Support Node (SGSN) 22. The SGSN 22 is linked to a Gateway GPRS Support Node (GGSN) 23 which in turn is linked to a traffic steering server 24. The traffic steering server 24 is linked to one or more provider servers 26, 28, 30.

General packet radio service (GPRS) is a packet oriented mobile data service on the 2G and 3G cellular communication systems global system for mobile communications (GSM). The GPRS mobile device 12 supports Internet protocol (IP), Point-to-point protocol (PPP) and X.25 connections.

The BS 16 is responsible for handling traffic and signaling between a mobile phone, such as GPRS mobile device 12, and a network switching subsystem. The BS 16 carries out transcoding of speech channels, allocation of radio channels to mobile phones, paging, transmission and reception over the air interface and many other tasks related to the radio network.

The BSC 18 handles allocation of radio channels, receives measurements from the mobile phones, and controls handovers from base transceiver station (BTS) to BTS. The BSC 18 includes a packet control unit (PCU) 32 that performs some of the processing tasks of the BSC 18, but for packet data. The allocation of channels between voice and data is controlled by the BS 16, but once a channel is allocated to the PCU 32, the PCU 32 takes full control over that channel.

The SGSN 22 takes care of some important tasks, including routing, handover and IP address assignment. The SGSN 22 has a logical connection to the GPRS device 12. As an example, if you where in a car traveling up the highway on a long journey and were browsing the Internet on the GPRS device 12, you will pass through many different cells. One job of the SGSN 22 is to make sure the connection is not interrupted as you make your journey passing from cell to cell. The SGSN 22 works out which BSC to "route" your connection through. If the user moves into a segment of the network that is managed by a different SGSN it will perform a handoff of to the new SGSN, this is done extremely quickly and generally the user will not notice this has happened. Any packets that are lost during this process are retransmitted. The SGSN 22 converts mobile data into IP and is connected to the traffic steering server 24 via a tunneling protocol.

The GGSN 23 acts as gateway, router and firewall rolled into one. In a traditional mobile network, a GGSN is responsible for the interworking between the GPRS network and an external packet switched network, like the Internet. In the network 10, unlike traditional networks, the GGSN 23 is traffic agnostic and relies on the the traffic steering server 24 to perform traffic steering.

The traffic steering server 24 multiplexes multiple services on a single access point name (APN). The traffic steering server 24 uses deep packet inspection and subscriber information obtained carrier databases to identify the specific unique services that are commingled or multiplexed onto a single APN and earmark them for routing and billing purposes. The traffic steering server 24 examines packets (i.e., the flow) that traverse the mobile GN link of the GGSN 23 and use a combination of packet protocols coupled with carrier defined work flow rates (database dips and policy queries) to properly route the packets to their next destination and earmark the billing CDRs for mediation and correlation by back office IT systems so the services can receive differentiated billing.

The traffic steering server 24 includes a processor 50 and memory 52. Memory 52 includes an operating system 54, such as Linux® or Windows®, and a traffic steering process 100, fully described below.

The one or more provider servers 26, 28, 30 handle different services, such as, for example, Internet Browsing, Messaging, Voice Mail, Voice over IP (VoIP) and Video Streaming.

The operation of the the traffic steering server 24 and how it multiplexes multiple services on a single access point name (APN) is best illustrated by an example.

Because of the fact that the APN concept was purposefully designed for carrier network selection and routing and not service application selection, carriers are looking at alternative approaches to how APNs are used in delivering 3G and LTE services. A majority of the carriers for both their 3G and 4G infrastructure are considering the use of a single APN to run all service on the mobile device. For example, a single APN in the LTE 4G domain might take on the following construct: SmartPhone.ATT.mnc012.mcc345.LTE Whereas Smartphone.ATT is a generic APN name followed by the Mobile Network Code, Mobile Country Code and LTE to represent it is a 4G based service. This APN would be provisioned in all 3G and 4G Smartphone's as a single way to get subscribers to the network that host their services. Once the subscriber's packets get to their home network, other means would be needed to get the packets routed to the proper application server. For example, LTE will host multiple services within the single APN such as:

1. LTE based Internet Browsing
2. LTE based Messaging
3. LTE based Voice Mail
4. LTE based Voice Over IP
5. LTE based Video Streaming In order for a single APN to be implemented, the network 10 must be capable of steering the traffic to the proper application server using something other than the APN. The single APN continues to perform network selection as it does today, but is augmented with service logic rules implemented in the various network elements and service nodes. Service logic rules (Service Orchestration) are used to logically steer the traffic to the appropriate service node responsible for instantiating the service application. Considering the devices will continue to have the ability to run multiple concurrent applications across the single APN, multiple TCP sessions will exist between the device and the network.

Use of a single APN does not resolve to any one service application. To get the service to the proper application service platform, some form of Packet Inspection (not necessarily DPI) coupled with rules based routing is implemented. Rules are placed in each of the responsible network elements along the path of the new APN to steer (path branching) the traffic towards the application server providing the specific service.

The following example better illustrates the operation of the network 10, which describes how a post-paid subscriber's packets traverses all the servers necessary to properly access the network, firewall, packet inspect, charge, content filter, and terminate the service on the application server and then onto the internet. The steps below depict how an example service with the APN name Wap.Cingular.mnc012.mcc345.gprs gets service in the home network.

A subscriber turns on the device 12 and the device 12 establishes a Packet Data Protocol (PDP) context with the SGSN 22 and the SGSN 22 begins tracking his mobility. This is the point where rules in the SGSN 22 give the device an SGSN-based PDP context and takes on responsibility for mobility management as the device moves across the network.

The subscriber then launches a browser, the browser chooses the underlying APN Wap.Cingular.mnc012.mcc345.gprs and requests a PDP Context Activation towards the SGSN 22.

The SGSN 22 performs a Domain Name System (DNS) query to determine which GGSN 23 hosts the internet browse service that is a "proxied" browse service.

After receiving the DNS response the packets are then forwarded to GGSN 23 which then forwards the packet to firewall and a set of firewall access rules are invoked to inspect the traffic.

The firewall then sends the packets to a load balancer that serves all of the GGSNs that host the APN Wap.Cingular.mnc012.mcc345.gprs.

The load balancer sends the traffic to the GGSN 23 and on to the traffic steering server 24 that performs packet inspection at Layer 4 (this Transport layer provides transparent transfer of data between end systems, or hosts, and is responsible for end-to-end error recovery and flow control) to determine the specific service being requested. The results of the packet inspection are used to determine next hop forwarding and select a route that gets the packets to the specific application service element, such as 26, 28 or 30. In the case of the Internet Browsing Service, the traffic steering server 24 may itself host the service and handle the traffic. For other cases such as Multimedia Messaging Service, the traffic steering server 24 chooses a path to the MMSC which hosts the service.

The traffic steering server 24 assigns the mobile device 12 an IP address and then forwards the packets to a content filter and a charging gateway where a set of content filtering and charging rules can be applied.

The subscriber gets a connection to the walled garden content source and the Firewall, Content Filter, and the Charging Gateway's begin looking at the http traffic flow to properly inspect, charge, and bill for the internet browse service.

As shown in FIG. 2, the traffic steering process 100 includes, in a mobile network, receiving (102) a flow of Internet Protocol (IP) packets having a generic access point name (APN) at a traffic steering server, the generic APN assigned by a carrier in the mobile network and representing a number of services. The flow of Internet Protocol (IP) packets can represent a service request from a mobile device in the mobile network. The number of services can include general browsing, multimedia messaging, visual voice mail and open internet access.

Process 100 identifies (104) a specific service multiplexed on the generic APN. Identifying (104) can include applying deep packet inspection (DPI) to the flow of IP packets and can be combined with subscriber information associated with the flow from a carrier database residing in the network.

Process 100 routes (106) the flow of IP packets to an application service element based on the identification. The application service element can include a server for general browsing, multimedia messaging, visual voice mail or open internet access.

Process 100 earmarks (108) billing CDRs for mediation and correlation by back office IT systems residing with the carrier in the network so the service receives billing.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method comprising:
   in a mobile network, receiving a flow of Internet Protocol (IP) packets having a generic access point name (APN) at a traffic steering server, the generic APN assigned by a carrier in the mobile network and representing a plurality of services;
   identifying a specific service multiplexed on the generic APN, wherein identifying the specific service comprises applying deep packet inspection (DPI) to the flow of IP packets and combining the DPI with subscriber information associated with the flow of IP packets; and
   routing the flow of IP packets to an application service element based on the identification.

2. The method of claim 1 wherein the plurality of services comprise general browsing, multimedia messaging, visual voice mail and open internet access.

3. The method of claim 1, wherein the subscriber information associated with the flow of IP packets resides in a carrier database residing in the network.

4. The method of claim 1 further comprising earmarking billing call detail records (CDRs) for mediation and correlation by back office IT systems residing with the carrier in the network so the service receives billing.

5. The method of claim 1 wherein the flow of IP packets represent a service request from a mobile device in the mobile network.

6. The method of claim 1 wherein the application service element comprises a server for general browsing, multimedia messaging, visual voice mail or open internet access.

7. A method comprising:
   in a General Packet Radio Service (GPRS) network, examining Internet Protocol (IP) packets that traverse a mobile GN link of a Gateway GPRS Support Node (GGSN); and
   applying a combination of packet protocols coupled with a carrier defined set of work flow rules to route the IP packets to their next destination and earmark billing call detail records (CDRs) for mediation and correlation by back office IT systems residing with a carrier in the mobile network, wherein applying the combination of packet protocols comprises applying deep packet inspection (DPI) to the flow of IP packets and combining the DPI with subscriber information associated with the flow of IP packets.

8. The method of claim 7 wherein the IP packets represent a service request from a GPRS mobile device.

9. The method of claim 7 wherein the service request is selected from the group consisting of general browsing, multimedia messaging, visual voice mail and open internet access.

10. The method of claim 7 wherein the carrier defined set of work flow rules comprise database dips and policy queries.

11. The method of claim 7 wherein the IP packets comprise a generic access point name (APN) assigned by a carrier in the mobile network.

12. The method of claim 7 wherein applying the DPI comprises performing packet inspection at Level 4 of the IP packets to determine a specific service being requested.

13. The method of claim 7 wherein the next destination is a specific application service element.

14. The method of claim 13 wherein the specific application service element comprises a server for general browsing, multimedia messaging, visual voice mail or open internet access.

15. A method comprising:
   in a General Packet Radio Service (GPRS) network, assigning a generic access point name (APN) to a plurality of services; and
   routing a flow of Internet Protocol (IP) packets having the APN to a traffic steering server for routing the flow of IP packets to an application service element based on an identification of the IP packets, the identification of the IP packets comprising an application of a combination of packet protocols, wherein the application of the combination of packet protocols comprises applying deep packet inspection (DPI) to the flow of IP packets and combining the DPI with subscriber information associated with the flow of IP packets.

16. The method of claim 15 wherein the plurality of services comprise general browsing, multimedia messaging, visual voice mail and open internet access.

17. The method of claim 15 wherein identifying the IP packets further comprises coupling the combination of packet protocols with a carrier defined set of work flow rules.

18. The method of claim 15 wherein the application service element comprises a server for general browsing, multimedia messaging, visual voice mail or open internet access.

19. The method of claim 15 further comprising earmarking billing call detail records (CDRs) for mediation and correlation by back office IT systems residing with a carrier in the mobile network.

\* \* \* \* \*